Aug. 2, 1927.
G. McKENZIE
1,637,345
MANUFACTURE AND TRUING OF BUILT-UP WHEELS
Filed June 16, 1926
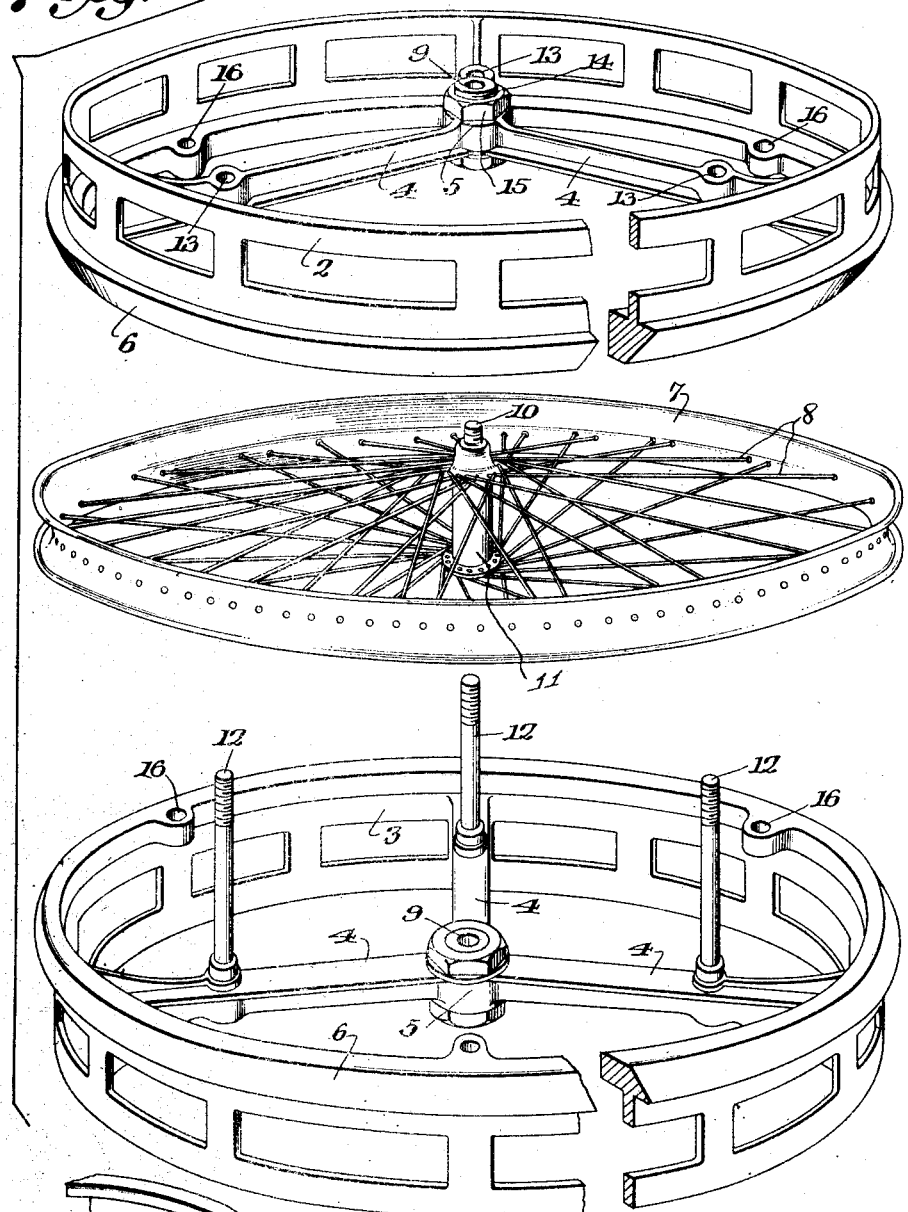
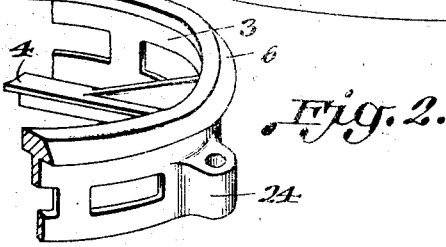
Inventor
George McKenzie Patented Aug. 2, 1927.

1,637,345

UNITED STATES PATENT OFFICE.

GEORGE McKENZIE, OF FINCHLEY, LONDON, ENGLAND.

MANUFACTURE AND TRUING OF BUILT-UP WHEELS.

Application filed June 16, 1926, Serial No. 116,465, and in Great Britain June 17, 1925.

This invention relates to jigs for use in the manufacture and truing of built-up wheels, of the kind comprising a pair of circular clamps between which the wheel rim is gripped by engagement of its inner periphery with bevelled surfaces formed on the acting edges of the clamps.

Such clamps have usually been carried upon coaxially arranged shafts rotatably mounted in bearings which permit moving one of the shafts and clamps endwise when mounting or dismounting a wheel. These shafts also carried adjustable devices adapted to centre the wheel hub after the spindle and bearing had been removed from it, and to retain it rigidly in its axial direction.

The object of the present invention is to provide a simplified construction which will be less costly to manufacture, and at the same time will in use automatically ensure accurate location of the wheel hub in the axial direction.

According to this invention, the two clamps, which mutually engage, form a self-contained unit and also provide in themselves a support for the wheel hub which engages the wheel spindle and is adapted to locate the hub centrally of the wheel and also to permit it to float freely in the axial direction during the tightening of the spokes.

The wheel, therefore, is built up with the hub spindle, cones and ball bearings in position, thus saving the necessity for removing them prior to mounting in the jig. Furthermore it automatically provides for hubs of different lengths without adjustment.

In the accompanying drawings, which illustrate the manner of carrying out the invention, Figure 1 is a perspective view of one form of the jig with a portion broken away to show the cross section of its rim, the two parts of the jig being separated, and the built-up wheel between the two parts, and Figure 2 is a fragmentary view of the jig showing a modification.

In a preferred method of carrying out the invention, the jig is broadly in the form of a wheel divided in its central plane into two parts 2 and 3 and having two, three or more arms 4 in each part connecting it with its hub 5. The rim portions are so shaped at their confronting edges 6 as to form, when drawn together, a circumferential channel adapted accurately to fit the inner periphery of the rim 7 of the wheel which is to be built, and the arms 4 preferably are at an angle to the plane of the jig, corresponding substantially to the angle of the spokes 8 to the plane of the built-up wheel.

The hub 5 of the jig carries, in axial locating holes 9, a spindle 10 or equivalent such as inwardly extending pins on which the hub 11 of the built-up wheel can be mounted axially free to adjust itself to the plane of the wheel under the lateral component of the spoke tension, but so as to be absolutely concentric with the rim 7 of the wheel when located in the jig. The two parts of the jig can be drawn together by any convenient means and exert a radial pressure on the rim which ensures a true circular form of the latter. If desired, registering devices may be provided either at the arms or in the rim of the jig. Preferably, however, the jig has three arms only, as shown, and these are adapted to be drawn together by powerful bolts 12 which may be fixed in one half of the jig and closely fit holes 13 provided in the other part so as to ensure accurate registration of the two parts of the jig. The jig parts do not come completely together but leave a space for the spoke nipples.

If desired the jigs may bear wholly upon the beads at the edge of the rim.

In operation a wheel is built up loosely in the known manner adopted prior to effecting the truing and finishing, and is then placed in the jig, and the latter is clamped together. It is then only necessary to tighten up each spoke nipple, preferably by means of a screw-driver, and in any approved order. This tightening can be effected by unskilled labour, and the only thing necessary is to ensure that every spoke is tightened up to the required extent, after which the jig is opened and the wheel is removed in a finished state.

To enable the jig to accommodate spindles of different size, the locating hole 9 may be formed in a bush 14 which is removably secured in the hub of the jig by securing means such as the nut 15. Also, if it is necessary to provide additional locating devices for the two parts of the jig, the holes 16 provided around it will serve either for guide pins or for clamping bolts.

If preferred the bolts 12 shown in Figure 1 may be omitted and lugs 24 may be provided around each part of the jig as shown in the fragmentary view in Figure 2.

What I claim as my invention and desire to secure by Letters Patent of the United States is:—

1. In a jig for the manufacture and truing of built-up wheels, the combination of a pair of circular clamps between which the wheel rim may be gripped, a bevelled annular portion on the clamps adapted to engage the inner periphery of the wheel rim, and a support for the wheel spindle carried by each clamp adapted to locate the wheel spindle centrally of the wheel and to allow it to float freely in the axial direction during the tightening of the spokes, substantially as set forth.

2. A jig as claimed in claim 1, in which a bush is provided having a locating hole for the wheel spindle, said bush being removably mounted in the circular clamp, substantially as set forth.

In testimony whereof I have signed my name to this specification.

GEORGE McKENZIE.